April 1, 1969  H. D. OGREN  3,435,688

FLUID SENSOR

Filed Jan. 3, 1966

*INVENTOR.*
HARVEY D. OGREN

BY *Ronald T. Reiling*

ATTORNEY

United States Patent Office 3,435,688
Patented Apr. 1, 1969

3,435,688
FLUID SENSOR
Harvey D. Ogren, St. Paul, Minn., assignor to Honeywell Inc., Minneapolis, Minn., a corporation of Delaware
Filed Jan. 3, 1966, Ser. No. 518,155
Int. Cl. G01c 19/28, 19/30, 19/50
U.S. Cl. 74—5.6       6 Claims

ABSTRACT OF THE DISCLOSURE

A two-axis sensor having a member hydrostatically mounted for rotation about three intersecting axes and means on said rotor for controlling the fluid flow rate through a first and second pair of apertures. The fluid signal in each pair of apertures being indicative of the amount and direction of rotation of said member about one of said axes.

---

This invention pertains to a fluid sensor and more particularly to a fluid displacement sensor providing a fluid output signal indicative of the magnitude and direction of displacement.

The applicant has provided a unique fluid displacement sensor having high reliability and accuracy at a low cost. The fluid displacement sensor provides a linear fluid output signal over the range of its operation. In addition, the applicant's fluid displacement sensor exerts negligible torquing upon the member whose displacement is being sensed. The fluid output signal can be directly interfaced with other fluid control devices, such as pure fluid amplifiers, in complete fluid systems without the need of additional interfacing devices.

In one particular embodiment, the applicant's fluid displacement sensor comprises a pair of apertures located within a housing means adapted to be connected to a fluid source. The member whose displacement is to be sensed is mounted for displacement relative to an axis. A pickoff element is mounted on the member contiguous to the aperture so as to control the fluid flow therethrough. Displacement of the member relative to the axis causes relative movement between the pickoff element and the aperture so as to create a fluid output signal (pressure or flow) indicative of the amount and direction of displacement.

Figure 2:
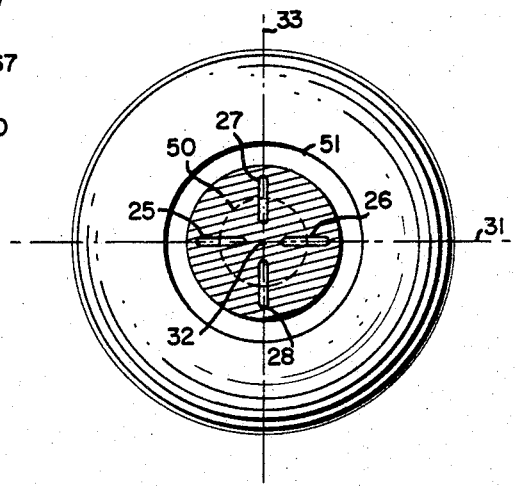
FIGURE 2 is a cross-sectional view taken along line 2—2 of FIGURE 1.
Figure 1:
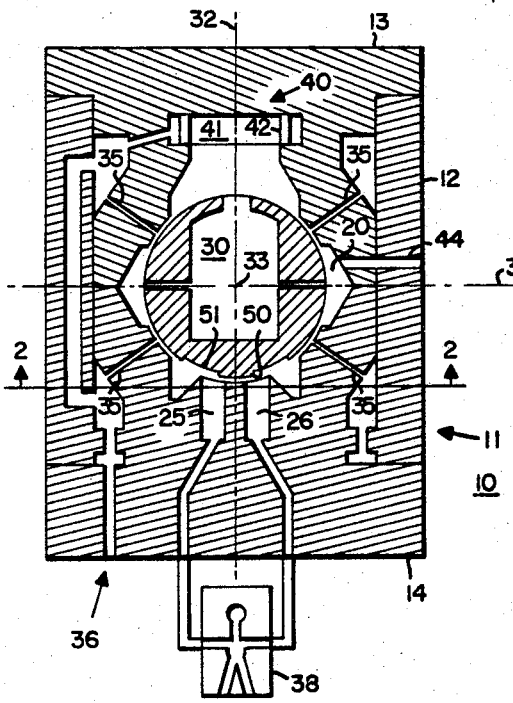
FIGURE 1 is a cross-sectional view of an attitude sensor utilizing the applicant's fluid displacement sensor.

Referring now to FIGURES 1 and 2, reference numeral 10 generally depicts an attitude sensor. Attitude sensor 10 includes a housing means 11 having a central portion 12, an upper end cap 13, and a lower end cap 14. Central portion 12, and end caps 13 and 14 cooperate to define a chamber 20 in housing means 11.

A spherical rotor means 30 is positioned within chamber 20 in housing means 11. Rotor means 30 is hydrostatically supported within chamber 20 for rotation about three intersecting axes, for example axes 31, 32, 33, by means of a plurality of hydrostatic bearing pads 35. Hydrostatic bearing pads 35 are adapted to be connected to a fluid source through supply passage 36 in housing means 11.

Means 40 are provided for rotating rotor 30 about spin axis 32. Means 40 comprises a fluid supply chamber 41 having a sintered metal ring 42 around a periphery thereof. Fluid is supplied from supply passage 36 through sintered ring 42, chamber 41, and through an opening in rotor means 30 into a chamber therein. The fluid exhausts from the chamber within rotor means 30 through tangential exhaust ducts in the rotor. A fluid exhaust passage 44 is provided in housing means 11 to allow fluid to exhaust from chamber 20.

As is best illustrated in FIGURE 2, housing means 11 has a first pair of apertures 25, 26, and a second pair of apertures 27, 28 therein. Apertures 25–28 are in communication with chamber 20. The apertures may be connected to means for determining the magnitude and sense of the fluid flow or pressure differential therein. For example, apertures 25 and 26 may be connected to the control ports of a first proportional pure fluid amplifier 38 and apertures 27 and 28 may be connected to the control ports of a second proportional pure fluid amplifier. It is not necessary that the apertures be connected to a fluid amplifier; other means for sensing the fluid flow and pressure differential may be utilized.

Rotor means 30 has a pickoff element 50 mounted thereon. In the particular embodiment illustrated, pickoff element 50 is formed integral with rotor 30 by forming an annular recess 51 in the surface of rotor means 30. Pickoff element 50 is positioned upon rotor means 30 contiguous to apertures 25 through 28 so as to control the flow of fluid therethough. In the particular embodiment illustrated, apertures 25 through 28 are equally angularly spaced about axis 32. When rotor means 30 is in the null position as illustrated in FIGURES 1 and 2, pickoff element 50 covers each of the apertures in equal amount so as to allow the same amount of fluid flow through each aperture.

In operation, supply passage 36 is connected to a source of fluid and rotor means 30 is supported in chamber 20 ment 50 allows equal fluid flow through each of the apertures for rotation about axes 31, 32, 33. Fluid also flows into the chamber in rotor means 30 and exhausts through the tangential nozzles so as to rotate rotor means 30 about axis 32 at a substantially constant angular velocity. A portion of the fluid supplied to chamber 20 exhausts through apertures 25 through 28. With rotor means 30 in the null position as illustrated in FIGURES 1 and 2, pickoff element 50 allows equal fluid flow thorugh each of the apertures. The fluid flow through the apertures is a portion of the fluid flowing into chamber 20 through bearing pads 35 and ring 42. In the null condition, there is no pressure or flow differential between apertures 25 and 26 or between apertures 27 and 28. However, if rotor means 30 rotates about axis 33 relative to housing means 11, in a clockwise direction as viewed in FIGURE 1, pickoff element 50 will cover more of aperture 25 than of aperture 26. This results in a fluid signal indicative of the direction and magnitude of displacement of rotor means 30 about axis 33. For example, if greater fluid flow is allowed through aperture 26 than through aperture 25, the magnitude of the difference in fluid flow is "indicative" of the magntiude of displacement of rotor means 30 about axis 33 and the sense of the fluid flow displacement indicates the direction of displacement. In some embodiments, it is desirable to measure the pressures in apertures 25 and 26 in which case the magnitude of the pressure differential is indicative of the magnitude of rotation and the sense of the pressure differential is indicative of the direction of rotation of rotor means 30 about axis 33. The fluid signal may be used directly in a fluid system or means such as amplifier can be utilized to determine the magnitude and sense of the fluid signal.

Apertures 27 and 28 function in a similar manner to provide a fluid signal indicative of the amount and direction of rotation of rotor means 30 about axis 31 relative to housing means 11.

It should be pointed out that the applicant's unique fluid sensor is not limited to the particular two axis embodiment illustrated and may be utilized as a single axis sensor. Furthermore, the applicant's unique fluid sensor is not limited to sensing rotational displacement as illustrated in FIGURES 1 and 2. It is within the scope of the applicant's invention to utilize a single aperture in conjunction with the pickoff element so as to provide a fluid output signal indicative of the displacement of the pickoff element relative to the aperture.

Figure 3:
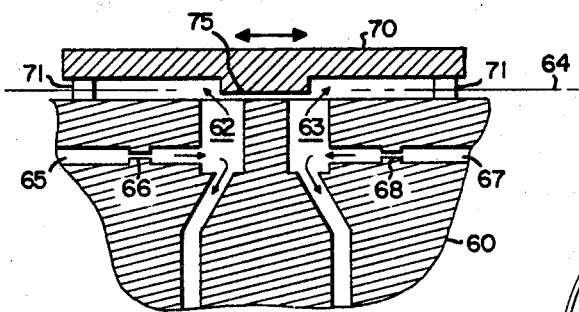
FIGURE 3 is a cross-sectional view of another embodiment of the applicant's invention.

Referring now to FIGURE 3, an alternate embodiment of the applicant's unique fluid displacement sensor is illustrated. The embodiment illustrated in FIGURE 3 functions to sense displacement along an axis. A housing means 60 is provided having an aperture 62 and an aperture 63 therein. Apertures 62 and 63 are positioned along an axis 64. Aperture 62 is adapted to be connected to a fluid source by means of a passage 65 having a fluid restrictor 6 therein. Aperture 63 is adapted to be connected to a fluid source through a passage 67 having a fluid resistor 68 therein.

A member 70 is mounted upon housing means 60 by means such as bearings 71 for displacement along axis 64 relative to housing means 60. A pickoff element 75 is mounted upon member 70 contiguous to apertures 62 and 63 so as to control the flow of fluid therethrough. In the null position, as illustrated in FIGURE 3, pickoff element 75 covers equal portions of apertures 62 and 63 so as to allow equal flow through each aperture.

In operation, apertures 62 and 63 are connected to a fluid source by means of passages 65 and 67. Fluid flows from the fluid source into the apertures; a portion of the fluid flows out of the apertures past pickoff element 75. The remainder of the fluid flows out the other end of the apertures which may be connected to a fluid amplifier if so desired. The arrows in FIGURE 3 illustrate the fluid flow through the apertures. Pickoff element 75 functions to restrict the flow of fluid through the apertures thereby causing a fluid signal (pressure or fluid flow) to be developed therein indicative of the magnitude and direction of displacement. Fluid restrictors 66 and 68 function to provide a fixed resistance in supply passages 65 and 67.

At the null position of member 70, there is equal fluid flow and equal pressure in apertures 62 and 63. Upon displacement of element 70 along axis 64, pickoff element 75 will allow greater fluid flow in one aperture than in the other. The difference in fluid flow (or pressure) is indicative of the amount of displacement of member 70 relative to housing means 60. The sense of the fluid flow (or pressure) differential is indicative of the direction of displacement element 70 along axis 64 relative to housing means 60. The fluid signal in the apertures can be used directly or means such as a fluid amplifier may be utilized to determine the magnitude and sense of the fluid signal.

The applicant has provided unique fluid displacement sensor that is highly reliable and at the same time relatively inexpensive.

While I have shown and described the specific embodiments of this invention, further modifications and improvements will occur to those skilled in the art. I desire to be understood, therefore, that this invention is not limited to the particular form shown, and I intend in the appended claims to cover all modifications which do not depart from the spirit of the scope of this invention.

What I claim is:
1. A two-axis fluid sensor comprising:
   housing means having a chamber therein;
   a first and a second pair of apertures within said housing means in communication with said chamber;
   rotor means hydrostatically mounted within said chamber for rotation about three intersecting axes including a first, second, and third axis; and
   a pickoff element mounted on said rotor, said pickoff element being contiguous to said apertures so as to control the fluid flow therethrough, whereby rotation of said rotor from the null position about said second axis causes relative movement between said pickoff element and said first pair of apertures so as to create a fluid signal therein indicative of the amount and direction of rotation about said second axis, and rotation of said rotor from the null position about said third axis causes relative movement between said pickoff element and said second pair of apertures so as to create a fluid signal therein indicative of the amount and direction of rotation about said third axis.

2. The fluid sensor set forth in claim 1 wherein said apertures are equally angularly spaced about said first axis.

3. The fluid sensor set forth in claim 2 wherein said pickoff element is symmetrical about said first axis when said rotor means is in the null position.

4. The fluid sensor set forth in claim 1 further characterized by means for determining the magnitude and sense of the fluid signal in said first pair of apertures and in said second pair of apertures.

5. The fluid sensor set forth in claim 1 wherein the fluid signal in said first and said second pair of apertures is a fluid flow differential therein further characterized by means for determining the magnitude and the sense of the fluid flow differential between said first pair of apertures so as to indicate the magnitude and direction of rotation of said rotor means about said second axis, and means for determining the magnitude and sense of the fluid flow differential between said second pair of apertures so as to indicate the magnitude and direction of rotation of said rotor means about said third axis.

6. The fluid sensor set forth in claim 1 wherein the fluid signal in said first and said second pair of apertures is a fluid pressure differential therein further characterized by means for determining the magnitude and the sense of the fluid pressure differential between said first pair of apertures so as to indicate the magnitude and direction of rotation of said rotor means about said second axis, and means for determining the magnitude and sense of the fluid pressure differential between said second pair of apertures so as to indicate the magnitude and direction of rotation of said rotor means about said third axis.

References Cited

UNITED STATES PATENTS

| | | | |
|---|---|---|---|
| 3,242,743 | 3/1966 | Samet | 74—5.7 |
| 3,254,538 | 6/1966 | Thomson et al. | 74—5.7 |
| 3,276,270 | 10/1966 | Speen | 74—5.6 |
| 3,311,987 | 4/1967 | Blazek | 74—5.6 |
| 3,320,816 | 5/1967 | Johnston | 74—5.6 |

C. J. HUSAR, *Primary Examiner.*

U.S. Cl. X.R.

74—5.43